(12) United States Patent
Hiraoka et al.

(10) Patent No.: US 12,228,452 B2
(45) Date of Patent: Feb. 18, 2025

(54) SPECTROMETER

(71) Applicant: Shimadzu Corporation, Kyoto (JP)

(72) Inventors: Ryoji Hiraoka, Kyoto (JP); Zeno Yonezawa, Kyoto (JP); Tetsuya Nagai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 195 days.

(21) Appl. No.: 17/917,002

(22) PCT Filed: Oct. 30, 2020

(86) PCT No.: PCT/JP2020/040843
§ 371 (c)(1),
(2) Date: Oct. 5, 2022

(87) PCT Pub. No.: WO2021/215032
PCT Pub. Date: Oct. 28, 2021

(65) Prior Publication Data
US 2023/0168125 A1    Jun. 1, 2023

(30) Foreign Application Priority Data
Apr. 23, 2020   (JP) ................................. 2020-076923

(51) Int. Cl.
*G01J 3/28*    (2006.01)
*G01J 3/18*    (2006.01)

(52) U.S. Cl.
CPC . *G01J 3/28* (2013.01); *G01J 3/18* (2013.01); *G01J 2003/2859* (2013.01)

(58) Field of Classification Search
CPC .. G01J 2003/2859; G01J 3/021; G01J 3/0264; G01J 3/027; G01J 3/18; G01J 3/28
See application file for complete search history.

(56) References Cited

U.S. PATENT DOCUMENTS 4,969,740 A * 11/1990 Sonobe .................... G01J 3/28
                                                                356/334
9,606,053 B1 * 3/2017 Wong ..................... G01J 3/2803
(Continued)

FOREIGN PATENT DOCUMENTS

JP     H01039788      2/1989
JP     2002064235     2/2002
(Continued)

OTHER PUBLICATIONS

Hamamatsu Photonics K.K., "PMA-12 multichannel spectrometer series," with English translation thereof, Jun. 2022, pp. 1-16, Available at: https://www.hamamatsu.com/resources/pdf/sys/SDSS0008J_PMA12.pdf.
(Continued)

*Primary Examiner* — Hina F Ayub
(74) *Attorney, Agent, or Firm* — JCIPRNET

(57) ABSTRACT

A mode of a spectrometer according to the present invention includes a spectrum measurement unit (11, 12) configured to repeatedly measure a spectrum over a predetermined wavelength range for measurement target light that is laser light; a peak counting unit (21, 22) configured to, every time a spectrum is obtained by the spectrum measurement unit, detect a peak from the spectrum and count the number of detected peaks; and a display processing unit (24) configured to display a numerical value of a peak counting result by the peak counting unit on a screen of a display unit in real time. With the spectrometer of the above mode, adjustment and the like of the multimode laser oscillator can be efficiently and accurately performed.

5 Claims, 3 Drawing Sheets

(56) References Cited

U.S. PATENT DOCUMENTS

2002/0021488 A1 2/2002 Sugawara
2003/0098975 A1 5/2003 Mori et al.
2005/0128476 A1 6/2005 Zhao

FOREIGN PATENT DOCUMENTS

JP      2003161654      6/2003
JP      2008016698      1/2008
WO      WO-2015100206 A1 *  7/2015  ................ G01J 1/42

OTHER PUBLICATIONS

Ishida Yuzou, "Generation of Ultrashort Pulsed Light", with English translation thereof, Optics, vol. 30, Mar. 2001, pp. 1-18, Available at: https://annex.jsap.or.jp/photonics/kogaku/public/30-06-kougi.pdf.
"International Search Report (Form PCT/ISA/210) of PCT/JP2020/040843," mailed on Dec. 22, 2020, with English translation thereof, pp. 1-4.
"Written Opinion of the International Searching Authority (Form PCT/ISA/237)" of PCT/JP2020/040843, mailed on Dec. 22, 2020, with English translation thereof, pp. 1-6.
Office Action of Japan Counterpart Application, with English translation thereof, issued on Sep. 5, 2023, pp. 1-8.
"Office Action of Japan Counterpart Application", issued on May 9, 2023, with English translation thereof, p. 1-p. 7.
Office Action of Japan Counterpart Application, with English translation thereof, issued on Dec. 26, 2023, pp. 1-9.

\* cited by examiner

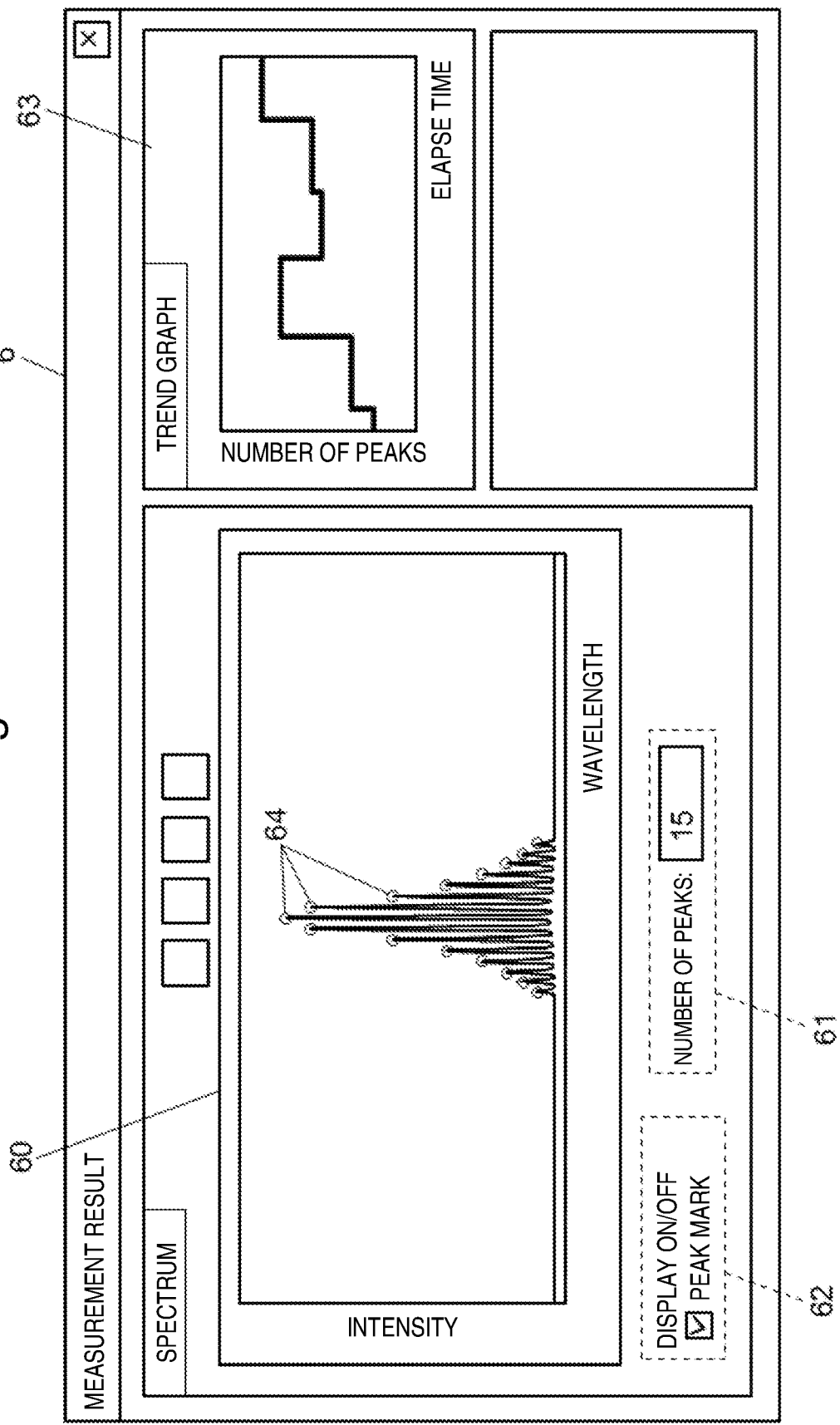

SPECTROMETER

CROSS-REFERENCE TO RELATED APPLICATION

This application is a 371 of international application of PCT application serial no. PCT/JP2020/040843, filed on Oct. 30, 2020, which claims the priority benefit of Japan application no. 2020-076923, filed on Apr. 23, 2020. The entirety of each of the above-mentioned patent applications is hereby incorporated by reference herein and made a part of this specification.

TECHNICAL FIELD

The present invention relates to a spectrometer, and particularly to a spectrometer suitable for analysis of laser light.

BACKGROUND ART

In recent years, lasers have been widely used in various fields such as optical communication, printing, medical treatment, and machining in addition to precision optical equipment, and the use range of the lasers has been increasingly expanded. In research and development of laser devices, adjustment in manufacturing processes, quality evaluation and management, and the like, monitoring of an emission spectrum of the laser light is essential, and for this purpose, a kind of spectrometer called an optical spectrum analyzer is widely used. The optical spectrum analyzer is a device which measures and displays a light intensity distribution (optical spectrum) of measurement target light input by an optical fiber or the like, and can check a peak wavelength, a peak width, or a light intensity on a spectrum.

Since general optical spectrum analyzers are intended to analyze and evaluate not only laser devices but also various optical devices, the general optical spectrum analyzers are suitable for detailed analysis, but tend to be inferior in real-time properties. In contrast, as a spectrometer in which real-time properties are more emphasized, a device called a multichannel spectrometer which can simultaneously measure the light intensity over a predetermined wavelength range for the measurement target light input to the device is known (refer to Non Patent Literature 1 and the like). Such a spectrometer is mainly used for measuring a spectrum by light emission, absorption, reflection, or the like in substantially real time. In addition, a multichannel spectrometer adapted to monitoring laser light having a narrow peak wavelength width with an enhanced wavelength resolution has also been developed.

CITATION LIST

Non Patent Literature

Non Patent Literature 1: "PMA-12 multichannel spectrometer series", [online], [searched on Feb. 3, 2020], Hamamatsu Photonics K.K., Internet Non Patent Literature 2: ISHIDA Yuzou, "Generation of Ultrashort Pulsed Light", Optics, Vol. 30, No. 6, 2001, ([online], [searched on Feb. 3, 2020], Internet)

SUMMARY OF INVENTION

Technical Problem

In the multichannel spectrometer having an enhanced wavelength resolution as described above, the optical spectrum (hereinafter, simply referred to as "spectrum") of the input laser light can be presented to a user in substantially real time, which is advantageous, for example, in an adjustment operation of a laser device. However, in general, it is not easy to perform appropriate adjustment and evaluation operations of a laser device while viewing the spectrum displayed in real time, and it is required to provide more effective information for such adjustment and evaluation operations, and the like.

The present invention has been made to solve such problems, and a main object of the present invention is to provide a spectrometer capable of efficiently and accurately performing adjustment and evaluation operations of a laser device and the like.

Solution to Problem

A mode of a spectrometer according to the present invention made to solve the above problems includes:
a spectrum measurement unit configured to repeatedly measure a spectrum over a predetermined wavelength range for measurement target light that is laser light;
a peak counting unit configured to, every time a spectrum is obtained by the spectrum measurement unit, detect a peak from the spectrum and count a number of detected peaks to obtain the number of the detected peaks corresponding to a number of longitudinal modes; and
a display processing unit configured to display a numerical value of a peak counting result by the peak counting unit on a screen of a display unit in real time.

Advantageous Effects of Invention

As is well known, lasers are roughly classified into a single-mode laser and a multimode laser. Since the single-mode laser has a high consistency property and a cross-sectional shape of the beam is circular, the single-mode laser is suitable for applications such as fine printing, medical treatment, and fine processing. On the other hand, although the multimode laser is inferior in the consistency property to the single-mode, it is easy to increase the output power, and is suitable for machining such as cutting and welding. In the single-mode laser, since the number of longitudinal modes is one, only one peak appears in the spectrum. Therefore, it is relatively easy for the user to adjust the laser device to oscillate in the single mode while checking the spectrum on the display screen.

On the other hand, in the multimode laser, a plurality of peaks appear in the spectrum. In particular, in the multimode laser, high output and short pulse are required, but in a case where the multimode laser is operated in a mode synchronization state, the pulse width and light intensity of the multimode laser depend on the number of longitudinal modes (refer to Non Patent Literature 2 and the like). Therefore, in an adjustment operation of a laser device that generates the multimode laser, it is important to control the number of longitudinal modes. In addition, in the multimode laser, it may be important to evaluate coherency, the broadness of the tail portion of the spectrum waveform, and the like, and it is necessary to grasp the number of peaks on the spectrum also in such evaluation. However, it is quite difficult for the user to read the number of peaks from the spectrum displayed in real time. The present inventor has focused on such a point, and has conceived of enabling the user to intuitively grasp the number of peaks observed in the obtained spectrum in real time.

That is, in the spectrometer of the above mode according to the present invention, when the laser light is provided as the measurement target light, every time the spectrum is updated, the number of peaks observed on the latest spectrum is displayed as a numerical value on the screen of the display unit. Therefore, with the spectrometer of the mode according to the present invention, the user can check the number of longitudinal modes of the laser light that is the measurement target, in real time on the screen of the display unit. Therefore, for example, when the user performs an adjustment operation of the multimode laser device, an adjustment can be performed so that the number of longitudinal modes becomes a desired number, or the propriety of the adjustment can be immediately determined by checking the number of longitudinal modes. Thus, the efficiency of the adjustment operation of the laser device and the like is improved, and the accuracy of the adjustment operation is also improved.

BRIEF DESCRIPTION OF DRAWINGS

FIG. 3 is a diagram illustrating an example of a display screen in the spectrometer of the present embodiment.

DESCRIPTION OF EMBODIMENTS

Hereinafter, an embodiment of a spectrometer according to the present invention will be described with reference to the accompanying drawings.

[Configuration of Spectrometer of Present Embodiment]

Figure 1:
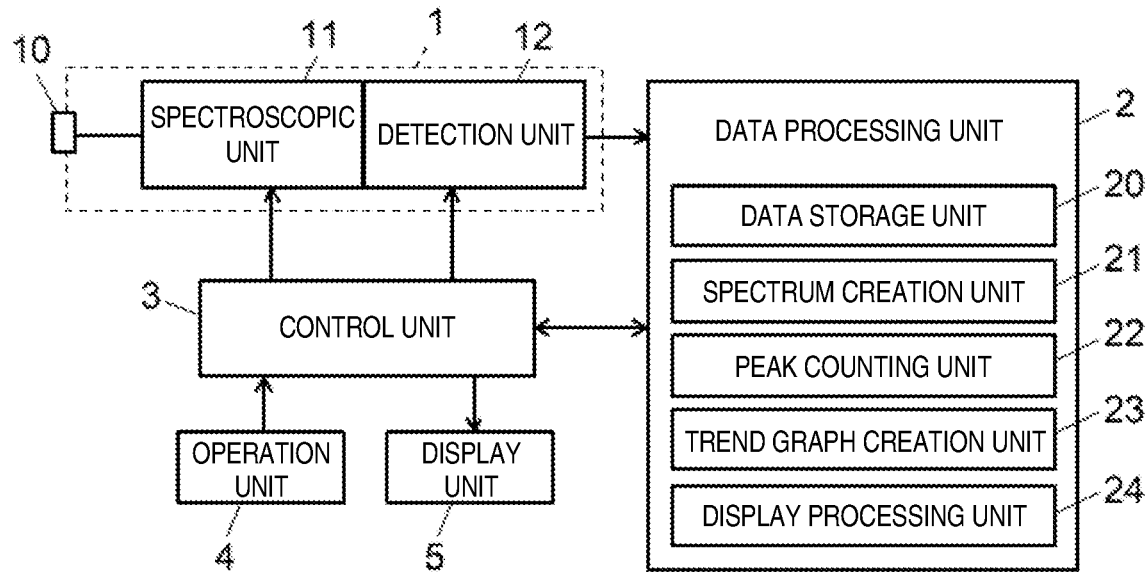
FIG. 1 is a configuration diagram of a main part of a spectrometer according to an embodiment of the present invention.

FIG. 1 is a configuration diagram of a main part of the spectrometer according to the present embodiment.

As illustrated in FIG. 1, the present device includes a multichannel spectrometer 1, a data processing unit 2, a control unit 3, an operation unit 4, and a display unit 5. The multichannel spectrometer 1 includes an optical input connector 10 to which an optical fiber for inputting measurement target light is connected, a spectroscopic unit 11 which wavelength-disperses the input measurement target light, and a multichannel detection unit 12 which detects wavelength-dispersed light. The data processing unit 2 includes, as functional blocks, a data storage unit 20, a spectrum creation unit 21, a peak counting unit 22, a trend graph creation unit 23, and a display processing unit 24.

The data processing unit 2 and the control unit 3 can realize respective functions by using a computer including a CPU or the like as a hardware resource and causing the computer to execute software installed in the computer.

Figure 2:
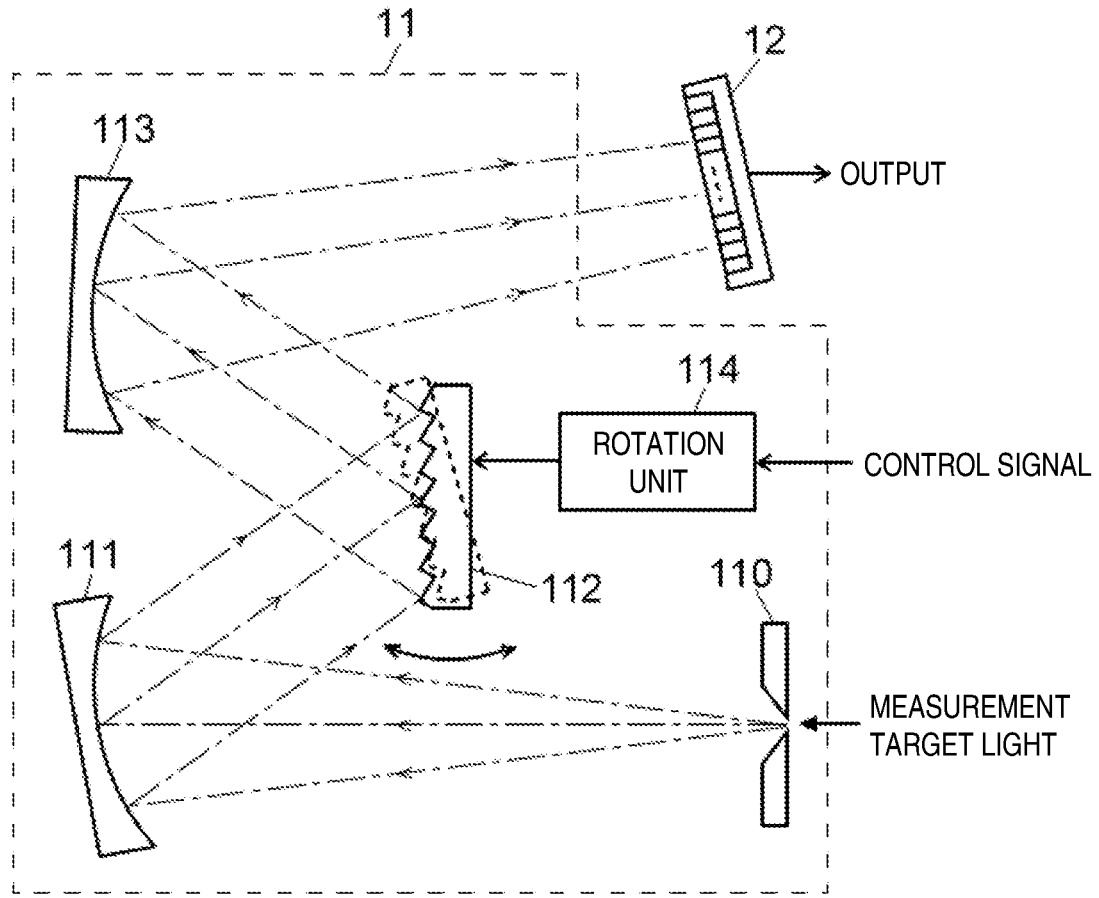
FIG. 2 is a schematic optical path configuration diagram of a multichannel spectrometer in the spectrometer of the present embodiment.

FIG. 2 is a schematic optical path configuration diagram of the multichannel spectrometer 1 in FIG. 1.

In FIG. 2, the spectroscopic unit 11 is a Czerny-Turner type spectrometer, and includes an incidence slit 110, a first concave mirror 111, a diffraction grating 112, a second concave mirror 113, and a rotation unit 114. The diffraction grating 112 is rotatable within a predetermined angle range by the rotation unit 114 including a motor and the like. The detection unit 12 is a linear sensor in which a large number of light receiving elements are arranged in a wavelength dispersion direction so that light in a predetermined wavelength range can be simultaneously detected. As the detection unit 12, for example, a CCD linear sensor or the like can be used.

[Measurement Operation of Spectrometer of Present Embodiment]

A normal measurement operation in the multichannel spectrometer 1 of the spectrometer of the present embodiment will be briefly described with reference to FIGS. 1 and 2.

At the time of measuring the measurement target light (multimode laser light or the like), an optical fiber for inputting the measurement target light is connected to the optical input connector 10. A user inputs a predetermined parameter for the measurement by performing a predetermined operation on the operation unit 4. Specifically, the user selects one of a plurality of options prepared in advance for each parameter such as a wavelength range as a measurement target (or a center wavelength of the wavelength range), an exposure time, and a peak detection condition (such as a threshold to be described later).

First, the control unit 3 controls the rotation unit 114 to set a diffraction surface of the diffraction grating 112 to have a predetermined initial angle with respect to the first concave mirror 111. The initial angle at this time corresponds to a wavelength range as one of the initially selected parameters. When the measurement is started and the measurement target light is introduced into the present device through the optical fiber, the measurement target light is introduced into the spectroscopic unit 11 through the incidence slit 110.

In the spectroscopic unit 11, the measurement target light first hits the first concave mirror 111, and is reflected by the first concave mirror 111 to travel toward the diffraction surface of the diffraction grating 112. The measurement target light at this time is substantially parallel light. The measurement target light that has hit the diffraction surface of the diffraction grating 112 is wavelength-dispersed, and is sent to the second concave mirror 113. The wavelength-dispersed light that has hit the second concave mirror 113 is reflected while being converged, and reaches each light receiving element of the detection unit 12. Light having different wavelengths within a predetermined wavelength range of $\lambda1$ to $\lambda2$ reaches each light receiving element of the detection unit 12. Each of the light receiving elements outputs a detection signal corresponding to the intensity of the incident light.

This detection signal corresponds to a spectrum of light having a wavelength range of $\lambda1$ to $\lambda2$. In the data processing unit 2, the data storage unit 20 digitizes the detection signal obtained by each light receiving element of the detection unit 12, and temporarily stores the digitized detection signal. At this time, the detection unit 12 first accumulates (that is, integrates) a light reception signal for the exposure time initially selected as one of the parameters, and generates the detection signal. Therefore, in a case where the intensity of the incident light is weak, it is possible to obtain a high-intensity detection signal by increasing the exposure time. In a case where the measurement target light is single laser light, the spectrum can be usually sufficiently covered in this one wavelength range.

On the other hand, in a case where the measurement target light is light obtained by combining a plurality of laser light beams having different center wavelengths, the multichannel spectrometer 1 repeats acquisition of the detection signals for different wavelength ranges. That is, when a detection signal over a predetermined wavelength range is obtained in a state where the position (angle) of the diffraction grating 112 is temporarily fixed, the control unit 3 controls the rotation unit 114 to change the angle of the diffraction surface of the diffraction grating 112 with respect to the measurement target light coming from the first concave mirror 111, by a predetermined angle. As a result, the wavelength range of the wavelength-dispersed light transmitted from the diffraction grating 112 to the second concave mirror 113 is changed. Therefore, in each light receiving element of the detection unit 12, a detection signal for light in a wavelength range (for example, $\lambda 2$ to $\lambda 3$) different from the wavelength range of $\lambda 1$ to $\lambda 2$ is obtained.

In this way, acquisition of the detection signal over a predetermined wavelength range by the detection unit 12 is repeated while the diffraction grating 112 is rotated by a predetermined angle. Thus, the data storage unit 20 can collect data representing the spectrum of light over the entire wavelength range initially selected as one of the parameters. When the collection of data over the entire predetermined wavelength range is completed, the control unit 3 returns the diffraction grating 112 to the initial position, and repeats the above-described measurement. As a result, the data representing the spectrum over the entire predetermined wavelength range is repeatedly obtained at predetermined time intervals.

[Display Process in Spectrometer of Present Embodiment]

Next, a display process operation performed by the data processing unit 2 on the basis of the data obtained as described above will be described. FIG. 3 is a diagram illustrating an example of a display screen of the display unit 5.

When the data of the spectrum over the entire predetermined wavelength range is obtained, the spectrum creation unit 21 creates a spectrum (emission spectrum) on the basis of the data. Next, the peak counting unit 22 detects peaks according to a predetermined algorithm for the created spectrum, and further counts the number of detected peaks. Although various algorithms are conceivable as the algorithm for peak detection, for example, the following method can be adopted.

Figure 4A:
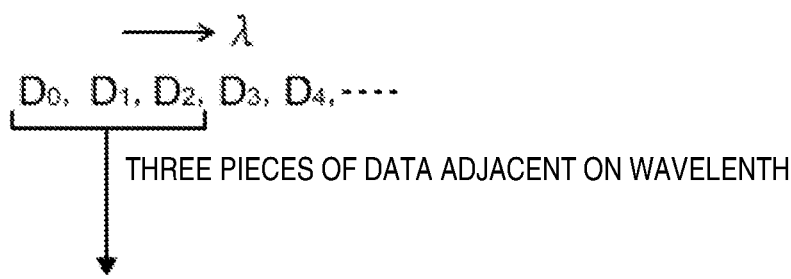
FIGS. 4A and 4B are explanatory diagrams of a peak counting process in the spectrometer of the present embodiment.
Figure 4B:
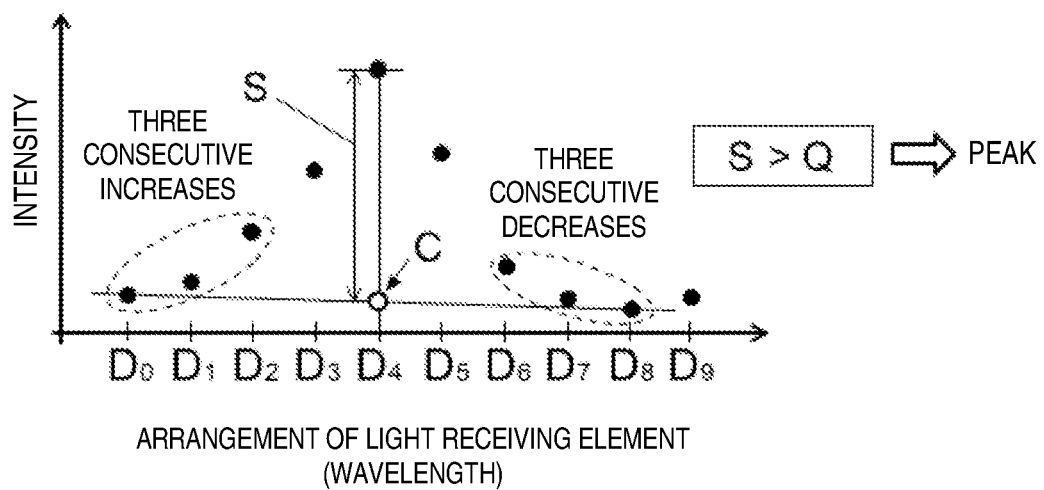

FIGS. 4A and 4B are explanatory diagrams of an example of a peak detection process.

As illustrated in FIG. 4A, data representing the light intensity on the wavelength axis are $D_0$, $D_1$, $D_2$, $D_3$, and the like. Each piece of the data is obtained by digitizing the detection signal obtained by one light receiving element of the detection unit 12. Here, $D_0$ is data of the shortest wavelength in the set wavelength range.

The parameters for the peak detection are the number of continuously changing data points P and a threshold Q of the intensity for identifying a peak and noise. In the example of FIGS. 4A and 4B, P=3.

As illustrated in FIG. 4A, intensity values of three (that is, P) consecutive pieces of data in one direction (in this example, the direction is the right direction (wavelength increasing direction), but may be the left direction (wavelength decreasing direction)) along the wavelength axis are examined, and a first set of three pieces of data in which the intensity values are increased in order is found. In the example of FIG. 4B, $D_0$, $D_1$, and $D_2$ are a set of the three pieces of data. Further, the intensity values of the data are examined in order in the wavelength increasing direction, and the last sets of three pieces of data in which the intensity values are decreased in order is found. In the example of FIG. 4B, $D_6$, $D_7$, and $D_8$ are a set of the three pieces of data. In this case, a range from the first piece of data in the first set of the three pieces of data to the third piece of data in the last set of the three pieces of data, that is, a range of $D_0$ to $D_8$ is a candidate for one peak.

Then, on the graph as illustrated in FIG. 4B, the intensity value of the first data $D_0$ of the first sets of three consecutive pieces of data and the intensity value of the last data $D_8$ of the last set of three consecutive pieces of data are connected by a straight line. Then, an intensity value S of the data $D_4$ is obtained with an intersection point C of the line and a perpendicular line passing through the data $D_4$ indicating the maximum intensity in the peak candidate, as a base point (zero point) of the intensity. When the intensity value S exceeds the threshold Q, the peak candidate is recognized as an official peak.

The peak detection is performed as described above from the data corresponding to the minimum wavelength to the data corresponding to the longest wavelength in the entire set wavelength range, the total number of peaks recognized as the official peaks is obtained, and the process is ended. By such a process, the number of peaks observed over the entire set wavelength range can be acquired.

The display processing unit 24 creates a measurement result display window 6 as illustrated in FIG. 3, and displays the measurement result display window 6 on the screen of the display unit 5 via the control unit 3. As illustrated in FIG. 3, on the measurement result display window 6, a spectrum display field 60, a peak number display field 61, a trend graph display field 63, and the like are arranged, and a display ON/OFF check box 62 is arranged on the left side of the peak number display field 61.

The display processing unit 24 displays the latest spectrum created by the spectrum creation unit 21 in the spectrum display field 60. Every time a new spectrum is acquired, the spectrum displayed in the spectrum display field 60 is updated. In addition, the display processing unit 24 displays the peak count value obtained by the peak counting unit 22 in the peak number display field 61 as a numerical value. In the example of FIG. 3, "15" is the number of peaks. This numerical value is also updated every time the number of peaks corresponding to the newly acquired spectrum is obtained, that is, substantially in real time. Further, in a case where a check mark is attached to the display ON/OFF check box 62, the display processing unit 24 displays a mark 64 indicating the peak counted as the number of peaks, that is, the peak detected according to the above-described algorithm on the spectrum displayed in the spectrum display field 60, in a superimposed manner.

In the example of FIG. 3, a circle mark attached to the vicinity of the peak top of each peak is the mark 64. As a matter of course, the mark 64 may be any mark as long as the mark can visually and easily distinguish a waveform counted as a peak from a waveform not counted as a peak, and for example, a mark having an appropriate shape such as an arrow mark can be used. In addition, a waveform counted as a peak and a waveform not counted as a peak may be indicated by changing a display color of the peak, instead of the mark. Alternatively, in a case where a process of counting peaks in which the intensity of the peak top is equal to or greater than a certain threshold is performed, instead of indicating each individual peak using the mark 64, a line indicating the level of the threshold used is displayed to be superimposed on the spectrum, and it may be possible to know that the peaks beyond the line are counted.

In addition, every time the numerical value of the number of peaks corresponding to the spectrum is obtained, the trend graph creation unit 23 creates a trend graph indicating a temporal change in the number of peaks with the horizontal axis representing time (or the number of samplings) and the vertical axis representing the number of peaks. The display processing unit 24 displays the created trend graph in the trend graph display field 63. Therefore, each time a new spectrum is obtained and the number of peaks is obtained on the basis of the spectrum, the trend graph is also updated, and a new line is added to the graph. Since the numerical value displayed in the peak number display field 61 is the latest value, the user cannot grasp the past numerical values even by viewing the numerical value. On the other hand, since the trend graph is a temporal progress, the user can check the value of the number of peaks in the past and the state of change in the number of peaks with the trend graph.

For example, in a case where a user performs an adjustment operation of a laser oscillator, when a parameter of the oscillator is changed, a position and the number of longitudinal modes of the laser is changed accordingly. Therefore, as the parameter of the laser oscillator is changed, the spectrum displayed in the spectrum display field 60 is changed, and the numerical value displayed in the peak number display field 61 is also changed. In addition, a line corresponding to the new number of peaks is also added on the trend graph displayed in the trend graph display field 63. Therefore, the user adjusts the parameter of the laser oscillator such that the number of peaks becomes a target value, for example, while viewing the display. In addition, in a case where it is desired to check the stability of the operation of the laser oscillator, the user may check whether the number of peaks does not fluctuate while viewing the above display.

As described above, with the spectrometer of the present embodiment, the user can perform adjustment and evaluation operations, and the like of the laser device while visually checking the numerical value of the counting result of the number of peaks on the spectrum and the information on the temporal change of the numerical value which are displayed on the screen of the display unit 5. Thus, efficient and accurate adjustment and evaluation operations can be performed.

MODIFICATIONS

In the above description, the mode of the display of the spectrum, the number of peaks, and the trend graph is not limited to that illustrated in FIG. 3, and can be appropriately changed.

In addition, the above embodiment is merely an example of the present invention, and it is a matter of course that modifications, revisions, and additions appropriately made within the scope of the gist of the present invention are included in the claims of the present application.

Various Modes

It will be understood by those skilled in the art that the exemplary embodiments described above are specific examples of the following modes.

(Clause 1) A mode of a spectrometer according to the present invention includes:

a spectrum measurement unit configured to repeatedly measure a spectrum over a predetermined wavelength range for measurement target light that is laser light;

a peak counting unit configured to, every time a spectrum is obtained by the spectrum measurement unit, detect a peak from the spectrum and count a number of detected peaks to obtain the number of the detected peaks corresponding to a number of longitudinal modes; and a display processing unit configured to display a numerical value of a peak counting result by the peak counting unit on a screen of a display unit in real time.

With the spectrometer described in Clause 1, the number of peaks corresponding to the number of longitudinal modes of the laser light is displayed on the display screen in real time. Therefore, for example, in a case where the user performs an adjustment operation of the multimode laser oscillator, it is possible to quickly determine the propriety of the adjustment on the basis of the number of peaks, the efficiency of the adjustment operation is improved, and the accuracy of the adjustment operation is also improved.

(Clause 2) The spectrometer described in Clause 1 may further include a graph creation unit configured to create a trend graph indicating a temporal progress of the peak counting result by the peak counting unit, in which the display processing unit is configured to display the trend graph on the same screen as the real-time numerical value of the peak counting result.

With the spectrometer described in Clause 2, the user can easily grasp the number of peaks at that time, that is, the number of longitudinal modes of the laser from the display, and can also grasp a temporal change in the number of longitudinal modes at a glance. Therefore, for example, the user can grasp the relationship between the adjustment state and the number of longitudinal modes corresponding to the adjustment state by checking the trend graph while adjusting the laser oscillator, and can quickly adjust the number of longitudinal modes to a desired number.

(Clause 3) In the spectrometer described in Clause 2, the display processing unit may be configured to display the spectrum obtained by the spectrum measurement unit, on the same screen as the trend graph and the real-time numerical value of the peak counting result, and display information indicating the detected individual peaks reflected in the numerical value, on the displayed spectrum.

With the spectrometer described in Clause 3, the user can check a waveform detected as a peak at that time and a waveform not detected as a peak, on the spectrum. Thus, the user can determine whether or not the peak detection condition (parameter) at that time is appropriate, and can change the peak detection condition as necessary.

(Clause 4) In the spectrometer described in any one of Clause 1 to Clause 3, the spectrum measurement unit may include a diffraction grating configured to separate or wavelength-disperse the measurement target light, a multichannel detector configured to simultaneously detect the light separated or wavelength-dispersed by the diffraction grating, and a rotation unit configured to rotate the diffraction grating to change the wavelength range of the wavelength-dispersed light reaching the detector.

With the spectrometer described in Clause 4, it is possible to measure a spectrum in a wide wavelength range in a short time while improving the wavelength resolution. Thereby, in the spectrometer described in Clause 4, a peak having a narrow wavelength width can also be observed, and the range and type of measurable laser light can be expanded.

The invention claimed is:

1. A spectrometer comprising:
a spectrum measurement unit;
a peak counting unit; and
a display processing unit, wherein a spectrum is repeatedly measured by the spectrum measurement unit over a predetermined wavelength range for measurement target light that is laser light, wherein every time a spectrum is obtained by the spectrum measurement unit, a peak is detected from the spectrum by the peak counting unit and a number of detected peaks is counted by the peak counting unit to obtain the number of the detected peaks corresponding to a number of longitudinal modes, and wherein a numerical value of a peak counting result by the peak counting unit is displayed on a screen of a display unit in real time by the display processing unit.

2. The spectrometer according to claim 1, further comprising a graph creation unit, wherein a trend graph indicating a temporal progress of the peak counting result by the peak counting unit is created by the graph creation unit, and wherein the trend graph is displayed on the same screen as the real-time numerical value of the peak counting result by the display processing unit.

3. The spectrometer according to claim 2, wherein the spectrum obtained by the spectrum measurement unit is displayed by the display processing unit, on the same screen as the trend graph and the real-time numerical value of the peak counting result, and information indicating the detected individual peaks reflected in the numerical value is displayed by the display processing unit on the displayed spectrum.

4. The spectrometer according to claim 1, wherein the spectrum measurement unit includes:

a diffraction grating, a multichannel detector, and a rotation unit, wherein the measurement target light is subjected to wavelength-disperse by the diffraction grating, wherein wavelength-dispersed light by the diffraction grating is simultaneously detected by the multichannel detector, and wherein the diffraction grating is rotated by the rotation unit to change the wavelength range of the wavelength-dispersed light reaching the detector.

5. The spectrometer according to claim 1, wherein the laser light is multimode laser light.

* * * * *